Dec. 20, 1932. K. E. PEILER 1,891,896
SUCTION GATHERING FORMING MACHINE
Filed Feb. 11, 1929 3 Sheets-Sheet 2
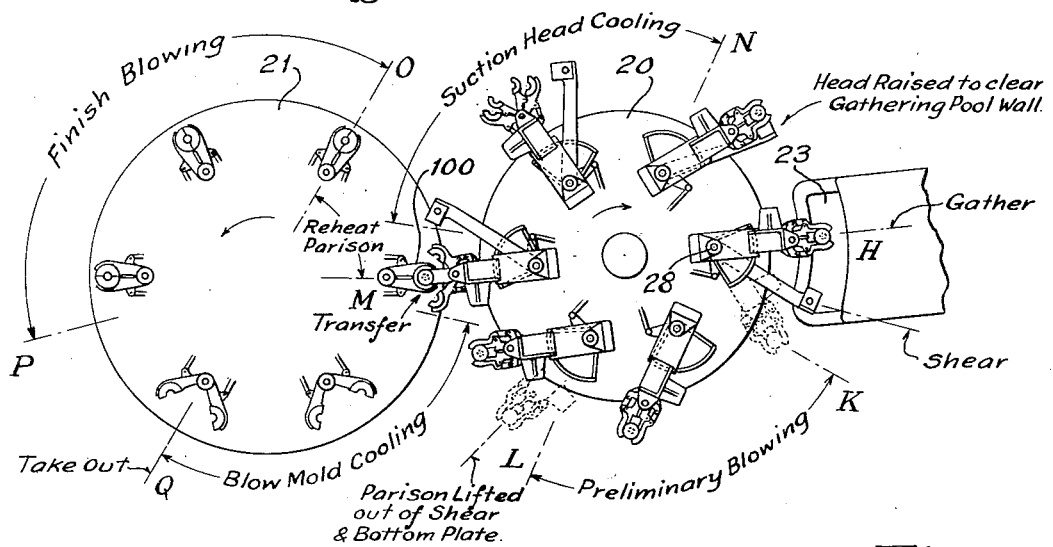
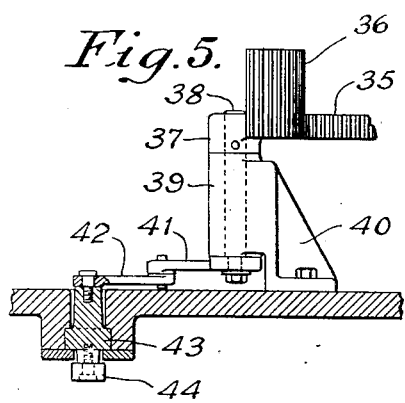
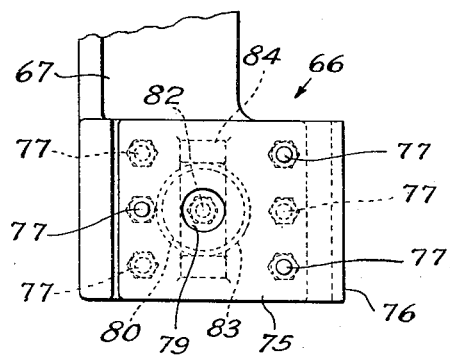
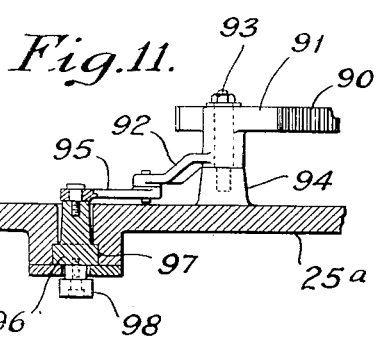
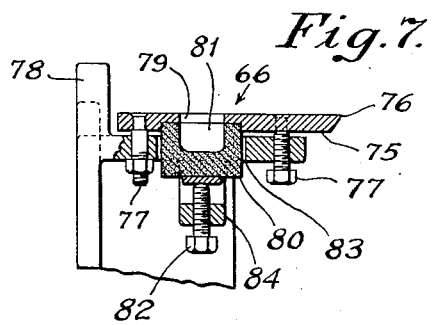
Witness:
A. A. Horn.
Inventor
Karl E. Peiler
by Robson D Brown
Attorney.

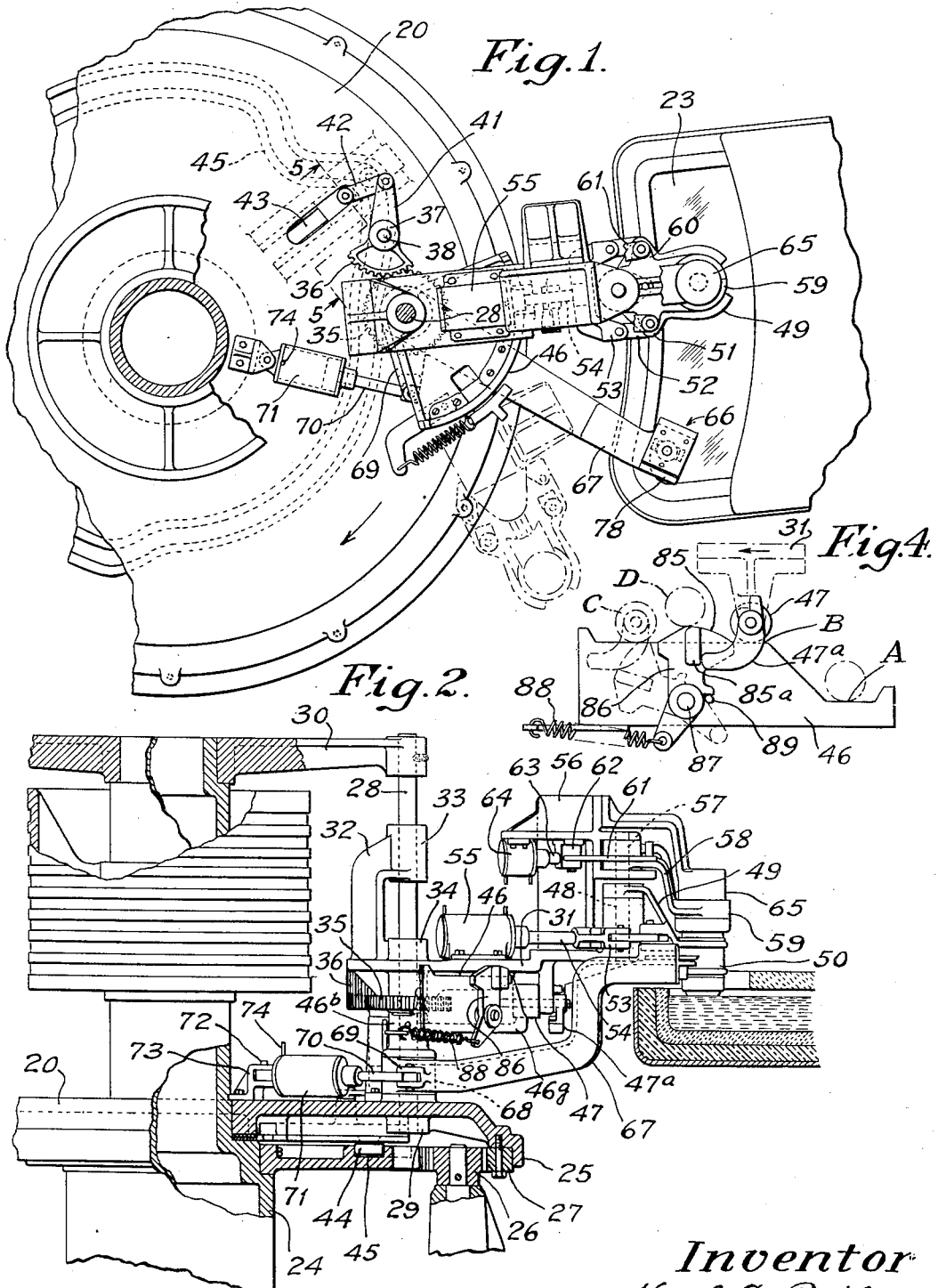

Dec. 20, 1932.   K. E. PEILER   1,891,896
SUCTION GATHERING FORMING MACHINE
Filed Feb. 11, 1929   3 Sheets-Sheet 3

Witness:
A. A. Horn

Inventor
Karl E. Peiler
by Robson D Brown
Attorney.

Patented Dec. 20, 1932

1,891,896

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

SUCTION GATHERING FORMING MACHINE

Application filed February 11, 1929. Serial No. 338,933.

My invention relates to glassware forming machines of the suction type. Particularly it relates to novel means for controlling the vertical positioning of the suction molds at various levels for the several operations of gathering charges, severing the charges, forming parisons and transferring the formed parisons to associated blow molds.

In the fabrication of glassware by the suction gathering method, it is usual to employ a machine comprising a plurality of similar suction parison molds, mounted at regularly spaced intervals upon a rotary table or spider. These molds are brought successively over a pool of glass and lowered to dip their lower ends into the glass, whereupon suction is applied through the molds to draw charges of glass thereinto. After the glass has been gathered, the molds are lifted to permit severance of the glass connecting that in the molds with that in the supply. It is usual to rely upon the suction gathering and shearing operation to form the parisons. I have heretofore proposed the provision of suitable bottom plates or bottom molds, which cap the filled molds and complete or enlarge the effective mold cavities, and of means for blowing the parisons into an intimate contact with the walls of the completed cavities. After the parisons have been formed, either through the suction process or through the suction process in combination with the positive formation of the parisons above mentioned, the parisons are transferred to a blow mold, one of which is usually associated with each suction mold, either upon the same or an adjacent spider or table, in which blow mold the parison is blown to final form.

The supply of glass from which the mold charges are gathered is maintained in a suitable extension of a furnace or in a rotary pot supplied from a furnace and which presents an upwardly facing bath contained within confining walls, over which the suction molds must be carried. Means are provided for lowering the suction mold at the proper time to submerge the lower end of the mold in the bath. After the charge has been collected, the mold is again lifted to permit severance of the glass and to clear the confining wall of the bath. It may be, and often is desirable, to form the parison and/or to transfer the parison at a level or levels other than that at which the charge is collected. Usually the mechanism for dipping and lifting the molds has lacked flexibility and has been limited to movement of the mold to and from two positions.

My invention contemplates the provision of a suction gathering forming machine provided with improved means for vertically moving and positioning the suction mold to a plurality of positions, for example, to a gathering position, a shearing position, a parison forming position, a position for freeing the lower ends of formed parisons from a bottom mold, and a parison transferring position. My novel machine provides positive, simple and flexible means for effecting these movements, through crown cams individual to each suction mold and which may be readily changed to change the character and extent of vertical movement of its particular mold, this readily permitting the use of different molds for any or all the suction units of the machine.

I further provide a novel combined shear and bottom mold structure, which cooperate with other novel structural features, to perform my novel and efficient method by which superior parisons may be formed and superior glassware made. Other novel features and advantages of my invention will be apparent from the following specification when considered in connection with the accompanying drawings, in which:

Figure 1 is a fragmentary plan view, partly in section, of a suction gathering bottle machine embodying my invention, illustrating more particularly a suction or parison mold unit mounted on a rotary table, and provided with my novel means for raising and lowering the suction mold;

Fig. 2 is a view in elevation and partly in vertical section of the apparatus of Fig. 1;

Fig. 3 is a diagrammatic plan view of a two-table bottle machine embodying the features shown in Figs. 1 and 2 and indicating generally a cycle of operation of such machine;

Fig. 4 is a development of the crown cam controlling the raising and lowering of the suction mold unit of Figs. 1 and 2;

Fig. 5 is an enlarged view, partly in elevation and partly in section taken on the line 5—5 of Fig. 1 of the apparatus for swinging the suction mold about its vertical pivot;

Figs. 6 and 7 are respectively an enlarged plan view and a vertical section of the shear structure of Figs. 1 and 2;

Figure 8:
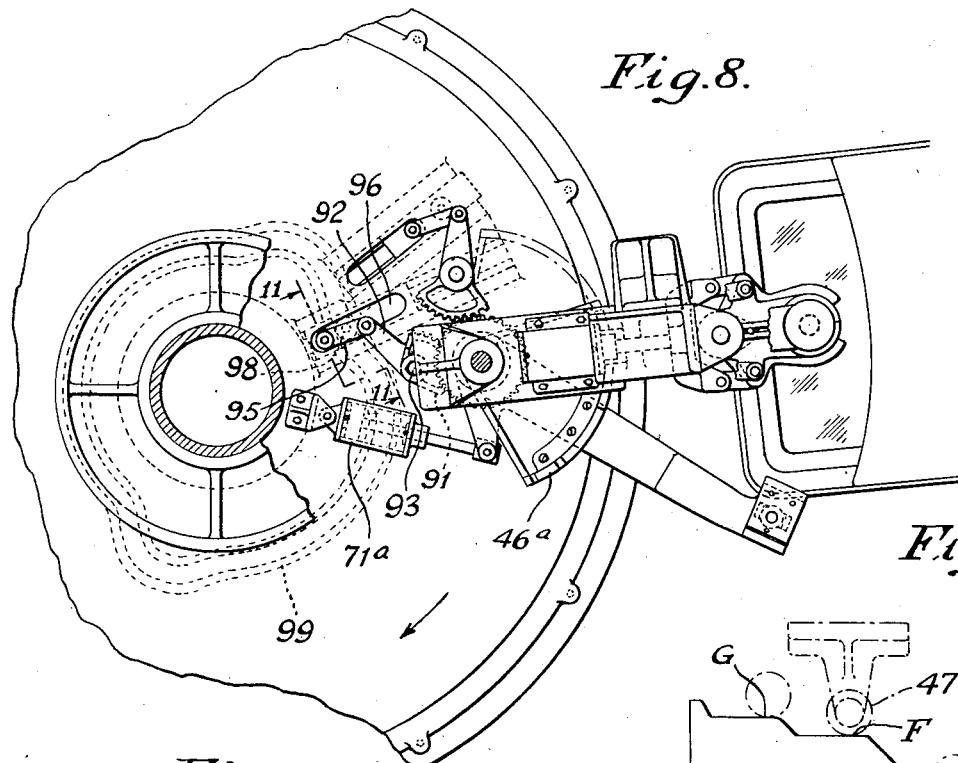
Figure 10:
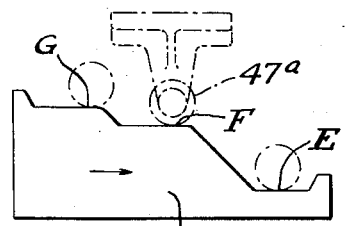
Figure 9:
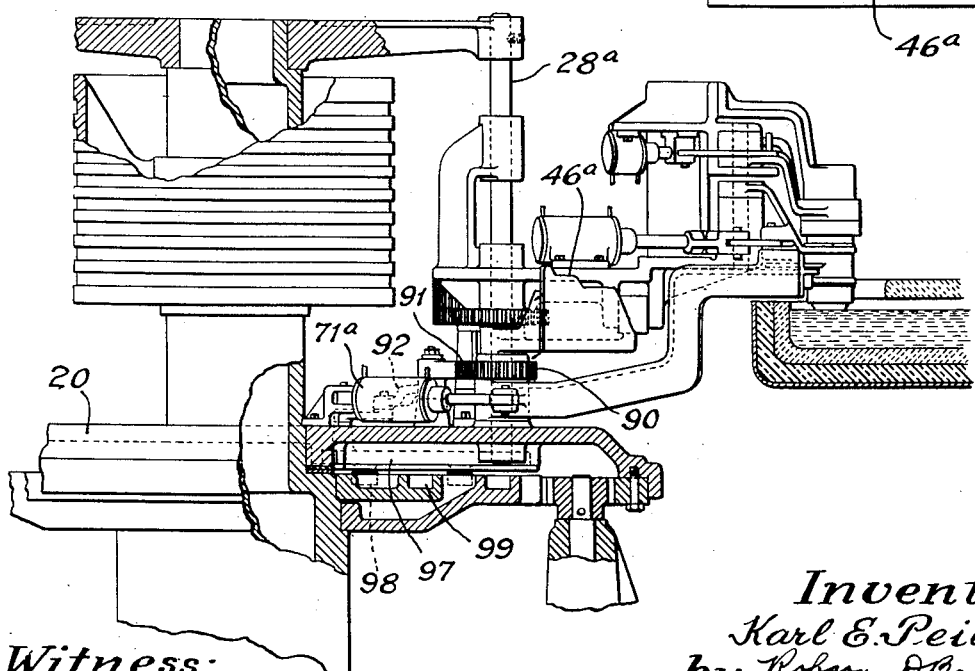

Figs. 8, 9 and 10 are views of a modified form of machine embodying my invention, corresponding respectively to Figs. 1, 2 and 4; and Fig. 11 is a view partly in elevation and partly in section taken on the line 11—11 of Fig. 8 of the mechanism for swinging the controlling cam.

Generally speaking, my invention is shown as embodied in a machine comprising a rotating spider or table on which is mounted a plurality of spaced suction gathering units, each including a divided parison mold, a divided neck ring, a combined suction and blow head, and a combined shear and bottom plate, together with mechanism for opening and closing the mold and neck ring. The mold, neck ring and the suction and blow head of each unit are mounted on a carriage which is supported for horizontal oscillation and for vertical reciprocation upon a shaft, and having a downward projecting cam roll adapted to run on the upper surface of a crown cam. Mechanism is provided for causing relative horizontal oscillating movement of the cam and the mold carriage at the proper times to cause the raising and lowering of the mold to a plurality of vertical positions, at which the several operations of gathering, severing, parison blowing or forming, disengagement of the lower end of the parison from the bottom mold, and of transferring the parison take place. As illustrated in the embodiment shown in Figs. 1 to 7 inclusive, the controlling cam is stationary with respect to the table and relative movement between the mold carriage and the cam is accomplished by means effecting the oscillation of the carriage. In the modification shown in Figs. 8 to 11 inclusive, the cam, as well as the carriage, is oscillated so that the relative movement of these parts may be caused in part by the movement of each. It will be obvious that this apparatus can be modified to provide a structure in which this relative movement is caused by the movement of the cam only. I have shown my invention as embodied in a two-table continuously rotating machine. However, my invention has obvious utility and may readily be applied to a single table machine; i. e., a machine in which the associated blow molds are mounted upon the same table as the suction molds. It is also obvious that my invention has utility and may readily be applied to a machine in which either one or two tables are employed and which is intermittently rotated.

Referring particularly to the embodiment of my invention shown in Figs. 1 to 7 inclusive as there shown, I provide a suction or parison mold table 20 and an adjacent blow mold table 21, these tables being designed to continuously rotate synchronously and in opposite directions, as indicated by the arrows, Fig. 3. I have indicated a suitable extension of a furnace containing a gathering pool 23, into which the suction molds are to be dipped and from which the charges are to be gathered.

The parison mold table 20 is shown as comprising a stationary column 24 about which a suitable table or spider 25 is rotated by any suitable means through a pinion 26 and ring gear 27. At regular spaced intervals about the table 25, arise pivot shafts 28 (six being shown), the lower ends of which are journaled as at 29 in the table 25, and their upper ends in journals formed in the ends of arms of a rotating spider 30. Mounted on each of the shafts 28 is a suction mold carrying carriage or plate 31, the inner end of which is integral with a bracket 32 providing a pair of hubs 33 and 34 surrounding the shaft 28, and by which the carrier 31 is supported for horizontal oscillation and vertical reciprocation.

The outer end of the plate 31 carries an upwardly projecting vertical pivot shaft 48 which provides a pivot for the holders 49 for complementary halves of a divided parison suction mold 50. Each of the holders 49 is provided with an ear 51 to which is pivoted one end of a link 52, the opposite end of which is pivoted to a yoke 53, which in turn is attached to the piston 54 of a piston operating in an air cylinder 55. Compressed air is supplied to and exhausted from the ends of cylinders 55 at the proper times by means well known in the art (not shown) to open and close the mold halves. A bracket 56 also arises from the plate 31 and carries a shaft 57 which serves as a pivot for the holders 58 for the halves of a divided neck ring 59. The holders 58 are provided with ears 60 to which are attached links 61, which in turn are pivotally connected to a yoke 62 attached to a piston rod 63 of a piston working in a cylinder 64. This cylinder, like the cylinder 55, is supplied with compressed air thereto through suitable control means (not shown) to move the piston at the proper times to open and close the neck ring. The bracket 56 also carries a combined suction and blow head 65, which may be of any well known type adapted to supply selectively suction or blowing pressure to the parison mold and neck ring. The details of this head are not shown, as they are well known in the art, and these details form no part of my present invention.

The lower hub 34 of the carrier 31 carries a gear 35 which meshes with a gear sector 36 provided with hub 37 mounted on a vertical shaft 38 which is supported in a bearing 39 formed in a suitable bracket 40 arising from the table 25. The lower end of the shaft 38 carries a crank arm 41 which is connected by a link 42 to a slide 43 mounted in suitable slideways formed radially of the table 25. The slide 43 carries a cam roll 44 which passes through a slot in the table 25 and runs in a stationary cam track 45. The sector 36 is of such depth that it will remain in mesh with the gear 35 in all vertical positions of the carrier 31. Thus the carrier 31, and the mold parts which are carried thereby, may be swung to a plurality of positions about the shaft 28, in response to variations in the contour of the cam track 45 to position the suction mold for its several operations and to provide the relative movement between the mold carriage and the cam controlling the vertical movement of the suction mold. A crown cam 46 stationary with respect to the table, is removably mounted upon a suitable bracket 46g having a hub 46b fixed on the shaft 28. A depending cam roller 47 mounted on the underside of the plate 31 runs on the crown of the cam 46.

A combined shear and bottom mold is associated with each suction gathering mold. As shown, a shear structure 66 is carried on the outer end of a bent lever 67, the inner end of which forms a hub portion 68 rotatably mounted on the shaft 28. The hub 68 carries a crank arm 69, the outer end of which is pivotally connected to the piston rod 70 of a piston working in a cylinder 71, the rearward end of which is pivotally connected, as at 72, to a suitable bracket 73 arising from the table 25. The cylinder 71 is provided with a suitable air connection 74 for the supply and exhaust of air to and from the inner end of the cylinder at suitable times. The control means for this air is not shown, but such means are well known in the art.

The details of the shear structure 66 are best shown in Figs. 6 and 7. The shear comprises a metallic plate 75, having a cutting edge 76 designed to pass over the bottom of the suction mold to sever the glass. The plate 75 is adjustably mounted upon the end of the arm 67 as by adjusting screws 77. Opposite to the cutting edge 76 the shear structure is provided with an upstanding stop member 78 formed on the arm 67 and which is designed to contact with the side of the suction mold to form a one-way drive for the shear by the mold for the purposes hereinafter explained. The shear blade 75 is provided with an aperture 79 designed at times to register with the bottom opening of the parison mold. A bottom mold or plate 80 of suitable mold material is mounted below the blade 75 and is provided with a cavity 81 registering with the opening 79 in the blade. The bottom mold 80 is adjustably and movably mounted on the bolt 82 passing upwardly through a bracket 84 formed in the arm 67 and is contained within a recess 83 formed in the arm 67. Thus the shear structure 66 provides not only a means for cutting the glass connecting the gather collected in the mold and the supply but also serves as a bottom plate or bottom mold which caps the lower end of the suction mold and with the mold, forms an enlarged mold cavity in which the parison may be positively formed by the application of compressed air through the suction and blow head.

The cam 46, which controls the vertical movement of the suction mold, may be so shaped as to give any desired operation. As best illustrated in Fig. 4, this cam which is of the crown type provides an upper surface which cooperates with the roll 47 of the mold carriage 31 to move the mold to three separate vertical positions as the roll arrives at four different horizontal positions. At the position marked A, which also corresponds to the position shown in Figs. 1 and 2, the roll 47 rests on the lowest part of the cam. When the roll is at this position, the mold is being dipped into the pool of glass to effect the gather. When the gather has been effected, the cam roll is moved to the position indicated at B which raises the mold from the glass. At this position the mold has been moved clockwise toward the shear, as shown in dotted lines in Fig. 1, and the shear is moved counterclockwise to sever the glass. As the severing is completed, the edge of the mold comes in contact with the upwardly projecting stop 78 on the shear structure and the continued movement of the mold in a clockwise direction about its pivot shaft 28 carries the roll 47 to the position indicated at C in Fig. 4. At this position, the cavity in the mold is in register with the opening 79 and the cavity 81 of the bottom plate. While the parts are in this position, the glass is blown into intimate contact with the walls of the mold and bottom plate and the parison formed. As the roll 47 moves from the position B to the position C to the left in Fig. 4, it passes an auxiliary cam member 85 formed on one edge of a bell crank lever 86 which is pivoted to the crown cam as at 87, and is provided at the opposite end with a spring 88, the opposite end of which is there connected to the extension of the crown cam structure, but the roll is not acted upon by the member 85, as that member is moved against its spring to the dotted position shown in Fig. 4 by the downwardly projecting finger 47a carried by the shaft of the roll 47. As the roll passes in the opposite direction toward position B, the auxiliary cam 85 is effective to lift the roll as at D, Fig. 4, the spring 88 and the stop 89 serving to position the auxiliary cam, as shown in full lines, and the finger 47a on this return movement of the roll riding freely over the stop 85a carried by the auxiliary cam. As the mold is lifted to the height indicated at the position D, the lower end of the parison which has been formed in the bottom plate is lifted out of that structure and carried free of the shear and thence back to the position indicated at B, in which position the suction mold and neck ring are maintained during the transfer operation.

As indicated at Fig. 3, the transfer is accomplished at a point approximately 180° from the gathering position. During the transfer, the parts are maintained at the vertical position determined by the roller 47 at position B. To effect the transfer, the suction mold halves 50 are opened and the parison is suspended from the closed neck ring 59, which carries it between the halves of an open blow mold. The blow mold is then closed around the suspended parison, the neck ring is opened and the transfer is effected. This transfer may be made continuous at the point of tangency of the paths of the suspended parison and the blow mold, or provision may be made to move the blow mold radially of its table during the transfer operation to cause it during that time to travel in a path about the center of the suction mold table and immediately below the neck ring. Mechanism for accomplishing this movement of the blow mold is fully disclosed in my copending application, Serial No. 323,954, filed December 5, 1928. The transfer may also be accomplished by providing suitable mechanism whereby the neck ring and the suspended parison is caused to move radially of its table and to follow the path of the blow mold upon the blow mold table.

Suitable mechanism to accomplish the transfer in this manner is disclosed and described in my copending application, Serial No. 323,955, filed December 5, 1928. The specific type of transfer forms no part of the present invention. Nor is it essential to the present invention that there be two tables or spiders, one carrying the suction parison molds and one the blow molds, for if desired, the blow molds may be mounted upon the same table or spider as the parison molds and suitable mechanisms may be provided for moving the neck ring and suspended parison into proper position to effect the transfer between molds on the same table.

In the form just described, the horizontal movements of the parison mold about the pivot shaft 28 and its vertical movements result from the rotation of the spider through the cam path 45 which operates the slide 43 and hence the sector 36 to suitably turn the carrier 31 about the shaft 28, these movements causing a relative movement of the roller 47 and the crown cam 46 to position the parts vertically at the proper time for the several operations.

The mechanism carried by the blow mold table is not shown in detail and in fact as appears in Fig. 3, each blow mold unit is indicated merely by a diagrammatic showing of a partible blow mold. It is of course to be understood that the blow molds are provided with suitable well known means for opening and closing them at proper times in the cycle of operations and with suitable blow heads and bottom plates, all of which are old and well known in the art, which act at the proper times to perform the final blowing operations and present the finished bottle to a suitable takeout mechanism (not shown).

In the modified form of machine, shown in Figs. 8 to 11 inclusive, the structure is quite similar to that heretofore described, except that the crown cam 46a is mounted on a frame adapted to swing about the pivot 28a and carries a gear 90 adapted to mesh with the sector gear 91 carried on one end of a bell crank 92 pivoted on a shaft 93 journaled in a bearing 94 on the table 25a. A link 95 is pivotally connected to the opposite end of the bell crank and this link in turn is pivoted to a slide 96 adapted to move in slideways 97 in the table 25a. The slide 96 carries a downwardly projecting cam roll 98 which runs in a stationary cam path 99. By means of this additional apparatus, the crown cam 46a is moved to accomplish a part at least of the relative movements of the cam and the mold carrier. In this modification, the air connections to the shear swinging cylinder 71a are such as to apply and exhaust compressed air from both ends of the cylinder to permit the use of the slightly differently formed cam 46a. This cam is best illustrated in Fig. 10, wherein various positions of the roll 47a on different portions of the cam is indicated. The position E corresponds to the position A of the cam 46, and at this position, the mold is dipped in the glass to effect a gather. At the position F, indicated in Fig. 10, the shearing takes place and the parison is formed. At the position G, the lower end of the parison may be lifted out of the bottom plate on the shear, following which the shear is moved to its retracted position by the application of air at the outer end of the cylinder 71a. The transfer of the parison may take place at the position E or the parts may be returned to the position F for the transfer depending upon the level of the transfer.

It is obvious that a device of my invention may be further modified by the elimination of the means for swinging the suction mold about the pivot, in which event the cam must be so swung as to give the desired vertical movement and positioning of the mold.

A peculiar advantage of my novel apparatus over prior art structures resides in the fact that the means for raising and lowering the suction mold and its mechanism is such as to permit the use in the same machine of suction and/or blow molds of varying lengths and capacity, whereby a single machine may be used to produce glassware of different kinds during a single operation. Such an ability in a suction gathering machine is a great commercial advantage, as the production of these machines is usually quite high and it has proved economical to use the suction gathering process, only when the factory is provided with large orders for one kind of glassware. It is obvious that by use of a different cam governing the raising and lowering of particular suction molds, suitable adjustment of the height of the shears and by the use of a suitably selected blow mold, the ware of different sizes can readily be made upon this machine.

The operation of the device of my invention will be described more particularly in connection with the form shown in Figs. 1 to 7 inclusive. Variations from this operation resulting from the use of the modified form of Figs. 8 to 11 will be obvious.

In operation, the furnace extension or pot 23 is continuously supplied with glass at suitable temperature and condition constantly supplied to maintain the glass level substantially constant. The tables 20 and 21 are continuously rotated about their respective centers, at proper speed and in suitable timed relation. The suction and blow head and the several cylinders are suitably supplied with connections automatically operated at the proper times to selectively supply suction and pressure through the head and to supply the cylinders with proper operating air. At the position H indicated in Fig. 3, the suction mold, neck ring and suction head are in the position indicated in Figs. 1 and 2. The roll 47 is at this time in the position indicated at A in Fig. 4, and suction is being applied and a gather made. As the table 20 rotates in a clockwise direction, the cam 45 actuates the slide 43 to cause clockwise movement of the mold carrier around the pivot post 28, which causes the roll 47 to rise upon the cam to the position B, lifting the mold from the glass. At this time compressed air is admitted to the cylinder 71 and the shear is forced in a counterclockwise direction to sever the glass and to position the bottom plate below the lower end of the mold. The suction which has been heretofore applied to the head 65 is relieved and blowing pressure is applied through the head. The mold carrier 31 is further moved in a clockwise direction about the pivot 28 carrying the roll 47 to the position indicated at C in Fig. 4. During this movement pressure is relieved in the shear operating cylinders 71 and the shear is moved with the mold by the contact of the mold with a stop 78. The glass is blown out against the walls of the mold and the bottom plate to form the parison, this operation taking place approximately between the points K and L indicated on Fig. 3, and while the roll is moving to the position C, Fig. 4.

When the parison has been completely formed, the cam 45 again actuates the sector 36, but this time to swing the carrier 31 in a counterclockwise direction. This causes the roll 47 to rise up upon the auxiliary cam surface 85 of the cam 46, as indicated at D, lifting the lower end of the parison out of the bottom plate, and leaving the shear and bottom plate in their inactive position, and returning the carrier 31 and the mold to the position indicated at B. By this time the parison mold in question is approaching the transfer position indicated at M, which as stated, may be at the point of tangency, or approximately so, between the paths of rotation of the suction mold and the associated blow mold on the table 21. As the mold approaches this transfer position, the bottom parison mold is opened, the parison being suspended from the neck ring 59 until the blow mold 100 closes about the parison, whereupon the neck ring is also opened. From this point the neck ring and parison mold travel in the open position and are cooled by suitable means, not shown, until they arrive at the point N, Fig. 3, at which the mold and neck ring are closed to prepare them for the next gathering operation. The roll 47 remains at the position indicated at B, Fig. 4, until the bottom of the mold has cleared the wall of the tank extension or pot 23, whereupon a counterclockwise movement of the carrier 31 is effected to cause the dip of the mold at the point H. Meanwhile the parison which has been transferred to the mold 100 is permitted to reheat as the blow mold is moved by the rotation of the table 21 from the point M to the point O. Between the points O and P, the parison is blown to final form by suitable blowing means (not shown) and at the point Q, the finished bottle is taken out. From the point Q to the transfer point M, the blow mold is opened and is cooled.

The apparatus embodying my invention herein disclosed may be modified in numerous ways and the cycle or method of operation of such machine may be widely varied within the scope of my invention, as set forth in the appended claims.

I claim:

1. A suction gathering glass forming machine comprising a rotary table, a carrier mounted on said table, a parison forming unit on the said carrier, a severing device and a mold bottom associated with said unit, means including a cam individual to said unit for raising and lowering said carrier to position said unit at different levels, said cam having surfaces thereon for effecting movement of the unit into positions to gather a charge of glass from the surface of a gathering pool, to cooperate with the severing device which severs the glass, for engagement with and disengagement from the mold bottom, and for transferring the parison to the blow mold, and means for rendering said cam operative for raising and lowering said unit.

2. A suction gathering glass forming machine comprising a rotary table, a shaft mounted on the table and spaced from the center thereof, a mold carrier mounted on the shaft, a suction mold on the carrier, a cam mounted on said shaft and adapted to move the carrier to a plurality of vertical operative positions, and means causing relative horizontal movement of the carrier and the cam about the shaft.

3. A suction gathering glassware forming machine comprising a rotating table, a carrier mounted thereon, a suction mold mounted on said carrier, means for oscillating the carrier about a vertical pivot carried by the table, and a crown cam made effective by the oscillation of the carrier to raise and lower the suction mold to a plurality of operative positions.

4. A suction gathering glassware forming machine comprising a rotating table, a plurality of suction mold units mounted thereon, a carrier for each unit mounted on said table, and crown cams individual to said units and adapted to raise and lower the carriers and units to a plurality of operative positions, and means for causing relative horizontal movement between the carriers and the cams.

5. A glassware forming machine of the suction gathering type comprising a rotary table, a mold carrier mounted thereon, a suction mold upon said carrier, a cam mounted on the table and adapted to raise and lower the carrier in response to relative horizontal movement of the cam and carrier, and means actuated by the rotation of the table for causing relative movement between the cam and carrier about a pivot moving with the table but fixed with respect to the table.

6. A suction gathering glassware forming machine comprising a continuously rotating table or spider, a plurality of suction mold carriers mounted on the table and each adapted for vertical sliding movement and for horizontal oscillatory movement, a suction mold mounted on each carrier, cams associated with each of said carriers and adapted to coact with the carriers to raise and lower the molds to a plurality of operative vertical positions, gears associated with each carrier for causing oscillation of the carrier and causing it to cooperate with its cam, and a stationary cam for moving the gears of all of the carriers to oscillate the carriers at predetermined times in response to rotary movement of the table about its center.

7. In a suction gathering glassware-forming machine having a pool of molten glass associated therewith, a rotary table, means for rotating said table, a mold carrier mounted thereon for oscillation about a vertical axis, a suction mold mounted on the carrier, means for oscillating the carrier relative to said table, means to dip the mold into the pool of glass to collect a mold charge and to raise the mold to a severing position, and means for causing the last named means to be operated by the same means which oscillates the carrier.

8. In combination with a bath of molten glass, a suction gathering glassware forming machine comprising a continuously rotating table, a pivot carried by the table, a mold carrier mounted on the pivot for oscillation thereabout, a suction mold, neck ring and suction and blow head mounted on the carrier, a combined shear blade and bottom mold mounted for oscillation about said pivot, means for oscillating the carrier, means for moving the shear blade and bottom plate in one direction about its pivot, a one-way driving means between the shear and suction mold for moving the combined shear and bottom plate in the other direction, a crown cam carried by the table associated with the carrier for vertically moving and positioning the suction mold, said cam being adapted to dip the mold to effect a gather, to raise it to a shearing position, to maintain it in such shearing position during a part of its oscillating movement, to lift the mold to free a parison from the bottom plate and to move the mold to a transfer position.

9. In a suction gathering glassware forming machine in combination with a bath of molten glass, a rotary table a mold carrier mounted thereon for oscillation about a vertical axis, a suction mold mounted on the carrier, a shear and a bottom mold associated with the suction mold, means for oscillating the carrier, means responsive to the oscillation of the carrier to dip the mold into the bath of glass to collect a mold charge and to raise the mold to a severing position, means for moving the shear to sever the glass collected in the mold and to bring the bottom mold into register with the suction mold, means for blowing the parison in the suction mold and bottom mold, and means responsive to the oscillation of the carrier for causing relative vertical movement between the bottom mold and the suction mold to free the lower end of the parison from the bottom plate.

10. A suction gathering glassware forming machine comprising a rotating table, a plurality of suction mold units mounted thereon, a carrier for each unit mounted on said table, cams individual to said units and adapted to raise and lower the carriers and units to a plurality of operative positions, means for removably securing said cams to said table, and means for causing relative horizontal movement between the carriers and the cams.

Signed at Hartford, Connecticut, this 30th day of January 1929.

KARL E. PEILER.